(12) United States Patent
Sasaki et al.

(10) Patent No.: US 9,660,251 B2
(45) Date of Patent: May 23, 2017

(54) ELECTRIC STORAGE DEVICE AND MANUFACTURING METHOD THEREOF

(71) Applicant: GS Yuasa International Ltd., Kyoto-shi (JP)

(72) Inventors: Takeshi Sasaki, Kyoto (JP); Taro Yamafuku, Kyoto (JP); Kazuki Kawaguchi, Kyoto (JP); Masaki Masuda, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 450 days.

(21) Appl. No.: 14/152,911

(22) Filed: Jan. 10, 2014

(65) Prior Publication Data

US 2014/0199582 A1 Jul. 17, 2014

(30) Foreign Application Priority Data

Jan. 11, 2013 (JP) ................................ 2013-004096
Dec. 18, 2013 (JP) ................................ 2013-261368

(51) Int. Cl.
*H01M 4/04* (2006.01)
*H01M 4/1397* (2010.01)
*H01M 4/66* (2006.01)
*H01M 4/136* (2010.01)
*H01M 4/36* (2006.01)
(Continued)

(52) U.S. Cl.
CPC ......... *H01M 4/0409* (2013.01); *H01M 4/043* (2013.01); *H01M 4/136* (2013.01);
(Continued)

(58) Field of Classification Search
CPC ......... H01M 10/0585; H01M 10/0525; H01M 10/0413
(Continued)

(56) References Cited

U.S. PATENT DOCUMENTS 5,702,845 A 12/1997 Kawakami et al.
8,486,564 B2 7/2013 Nagai et al.
(Continued)

FOREIGN PATENT DOCUMENTS

CN 103765636 A 4/2014
JP 2000-323123 A 11/2000
(Continued)

OTHER PUBLICATIONS

European Search Report dated May 22, 2014.

*Primary Examiner* — James Lee
(74) *Attorney, Agent, or Firm* — McGinn IP Law Group, PLLC.

(57) ABSTRACT

Provided is an electric storage device including: a first electrode plate; a second electrode plate having a polarity opposite to that of the first electrode plate; and a separator interposed between the first electrode plate and the second electrode plate, wherein the first electrode plate includes a current collector and a mixture layer laminated onto the current collector, the mixture layer contains at least one of the binder and the conductive additive, primary particles of an active material, and secondary particles each having a hollow region formed therein by aggregation of a plurality of the primary particles, and the at least one of the binder and the conductive additive is partially distributed in the hollow region.

16 Claims, 9 Drawing Sheets
(3 of 9 Drawing Sheet(s) Filed in Color)

(51) Int. Cl.
| | |
|---|---|
| *H01M 4/58* | (2010.01) |
| *H01M 4/62* | (2006.01) |
| *H01M 10/0525* | (2010.01) |
| *H01M 10/0587* | (2010.01) |
| *H01M 4/02* | (2006.01) |

(52) U.S. Cl.
CPC ......... *H01M 4/1397* (2013.01); *H01M 4/364* (2013.01); *H01M 4/5825* (2013.01); *H01M 4/623* (2013.01); *H01M 4/625* (2013.01); *H01M 4/663* (2013.01); *H01M 4/667* (2013.01); *H01M 10/0525* (2013.01); *H01M 10/0587* (2013.01); *H01M 2004/021* (2013.01)

(58) Field of Classification Search
USPC .............................................. 429/162; 427/58
See application file for complete search history.

(56) References Cited

U.S. PATENT DOCUMENTS

| | | | |
|---|---|---|---|
| 2003/0194605 A1 | 10/2003 | Fauteux et al. | |
| 2005/0048367 A1 | 3/2005 | Igaki et al. | |
| 2005/0058907 A1 | 3/2005 | Kurihara et al. | |
| 2005/0064289 A1 | 3/2005 | Suzuki et al. | |
| 2007/0003835 A1 | 1/2007 | Hasegawa et al. | |
| 2007/0003836 A1 | 1/2007 | Suzuki et al. | |
| 2009/0246626 A1 | 10/2009 | Tasaki et al. | |
| 2010/0209771 A1* | 8/2010 | Shizuka | B82Y 30/00 429/207 |
| 2012/0282525 A1 | 11/2012 | Nagai et al. | |
| 2013/0052535 A1 | 2/2013 | Yanagihara et al. | |
| 2013/0209888 A1* | 8/2013 | Nagai | H01M 4/131 429/231.1 |
| 2013/0302687 A1 | 11/2013 | Nagai et al. | |
| 2014/0199590 A1 | 7/2014 | Tamaki et al. | |

FOREIGN PATENT DOCUMENTS

| | | | |
|---|---|---|---|
| JP | 2005-78933 A | 3/2005 | |
| JP | 2011-119092 A | 6/2011 | |
| JP | 2012-114048 A | 6/2012 | |
| JP | 2012-178244 A | 9/2012 | |
| JP | 2012-234766 A | 11/2012 | |
| WO | WO 2012/049779 * | 4/2012 | ............ H01M 4/525 |
| WO | WO 2012/049779 A1 | 4/2012 | |
| WO | WO 2013/031477 A1 | 3/2013 | |

* cited by examiner

ELECTRIC STORAGE DEVICE AND MANUFACTURING METHOD THEREOF

CROSS-REFERENCE TO RELATED APPLICATIONS

This application claims the benefit of Japanese Patent Application Nos. 2013-004096 and 2013-261368, filed on Jan. 11, 2013 and Dec. 18, 2013, respectively, which are incorporated herein by reference.

FIELD

The present invention relates to an electric storage device and a method for producing the electric storage device.

BACKGROUND

As an electric storage device, nonaqueous electrolyte secondary battery cells such as a lithium ion secondary battery cell are conventionally known. Further, as such a nonaqueous electrolyte secondary battery cell, a battery cell including an electrode group as an electrode assembly and a case housing the electrode group that includes electrode plates respectively having positive and negative polarities is known.

Specifically, the electrode group has a positive electrode plate and a negative electrode plate as the electrode plates, the positive electrode plate includes a positive electrode current collector and a positive electrode active material supported on the positive electrode current collector, and the negative electrode plate includes a negative electrode current collector and a negative electrode active material supported on the negative electrode current collector. Further, the electrode group is formed by layering the positive electrode plate, the negative electrode plate, and a separator interposed between the positive electrode plate and the negative electrode plate together. Furthermore, an electrolyte solution is injected in the case.

As a known electrode plate, there can be mentioned, for example, those formed by compressing, in the thickness direction, a stack of a current collector and a mixture layer containing a binder and secondary particles each having a hollow region formed therein by aggregation of a plurality of primary particles of an active material (see JP 2009-283354 A and JP 2011-119092 A).

The secondary particles with such a hollow structure contained in the mixture layer enhance the penetration of the electrolyte solution into the hollow regions of the secondary particles. This improves the ion conductance of the mixture layer, thereby allowing an electrode plate with an improved conductivity to be obtained. Further, such compression as mentioned above brings the current collector and the active material in the mixture layer to close contact with each other. As a result, an increase in resistance due to the above-mentioned hollow regions is suppressed.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the above-mentioned electric storage devices, the secondary particles are partially deagglomerated during production of the electrode plate by compression (pressing) after lamination of the mixture layer, etc., onto the current collector. Accordingly, the interfaces of the particles increase in the above-mentioned electric storage device after such deagglomeration. Therefore, there has been a problem of an increase in resistance (because the current collection performance of the particles deteriorates after the deagglomeration). In this way, such an increase in resistance is not necessarily sufficiently suppressed in the electric storage devices including conventional electrode plates containing the above-mentioned secondary particles.

In view of the above-mentioned problem, it is an object of the present invention to provide an electric storage device in which the increase in resistance is sufficiently suppressed and a method for producing the electric storage device.

An electric storage device according to the present invention includes: a first electrode plate; a second electrode plate having a polarity opposite to that of the first electrode plate; and a separator interposed between the first electrode plate and the second electrode plate, wherein the first electrode plate includes a current collector and a mixture layer laminated onto the current collector, the mixture layer contains at least one of a binder and a conductive additive, primary particles of an active material, and secondary particles each having a hollow region formed therein by aggregation of a plurality of the primary particles, and the at least one of the binder and the conductive additive is partially distributed in the hollow region.

BRIEF DESCRIPTION OF DRAWINGS

The patent or application file contains at least one drawing executed in color. Copies of this patent or patent application publication with color drawing(s) will be provided by the Office upon request and payment of the necessary fee.

The foregoing and other features of the present invention will become apparent from the following description and drawings of an illustrative embodiment of the invention in which.

DESCRIPTION OF EMBODIMENTS

Figure 1:
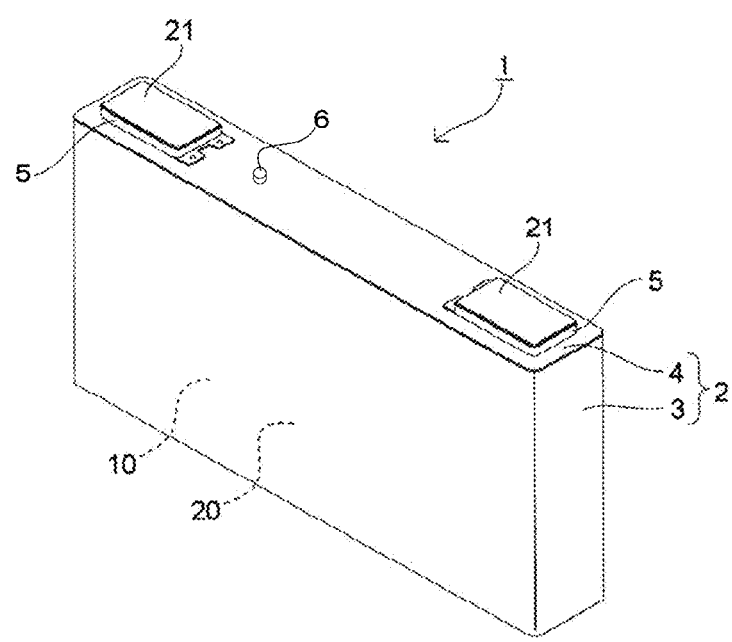
FIG. 1 is a schematic perspective view showing a nonaqueous electrolyte secondary battery cell according to a first embodiment of the present invention.

An electric storage device according to one embodiment of the present invention includes: a first electrode plate; a second electrode plate having a polarity opposite to that of the first electrode plate; and a separator interposed between the first electrode plate and the second electrode plate, wherein the first electrode plate includes a current collector and a mixture layer laminated onto the current collector, the mixture layer contains at least one of a binder and a conductive additive, primary particles of an active material, and secondary particles each having a hollow region formed therein by aggregation of a plurality of the primary particles, and the at least one of the binder and the conductive additive is partially distributed in the hollow region.

Here, the phrase "having a hollow region formed therein" means not only having therein a hollow region covered by aggregated primary particles but also having therein a hollow region that is partially uncovered by the primary particles. In other words, the hollow region is a region unfilled with the primary particles.

According to such a configuration, at least one of a binder and a conductive additive is distributed in the hollow region in the first electrode plate, thereby suppressing the increase in resistance due to the hollow region.

Accordingly, an electric storage device in which the increase in resistance is sufficiently suppressed can be obtained.

Further, according to one aspect of the electric storage device of this embodiment, the mixture layer has pores with an average pore size of 0.01 to 0.1 µm.

According to such a configuration, the pores have an average pore size of 0.01 to 0.1 µm, thereby bringing the active material particles in the mixture layer into closer contact with each other. Thus, an electric storage device in which the increase in resistance is more sufficiently suppressed can be obtained.

According to another aspect of the electric storage device of this embodiment, the active material contained in the mixture layer is lithium iron phosphate.

According to another aspect of the electric storage device of this embodiment, the primary particles have an average particle size of 100 to 500 nm.

According to another aspect of the electric storage device of this embodiment, the layered stack of the current collector and the mixture layer is compressed in the thickness direction by a compressive force of 50 to 500 kgf/cm.

According to another aspect of the electric storage device of this embodiment, the binder is polyvinylidene fluoride.

According to another aspect of the electric storage device of this embodiment, the conductive additive is acetylene black.

According to another aspect of the electric storage device of this embodiment, the first electrode plate further includes a conductive layer between the current collector and the mixture layer, and the primary particles as a constituent of the mixture layer are partially retained in the conductive layer.

According to such a configuration, the primary particles as a constituent of the mixture layer are partially retained in the conductive layer of the first electrode plate, thereby bringing the mixture layer and the conductive layer into comparatively close contact with each other. This suppresses the contact between the mixture layer and the conductive layer from being made loose, even when the secondary particles undergo time-dependent changes in shape, or expansion and contraction due to repeated charge and discharge. Moreover, the contact between the conductive layer and the current collecting layer provides a sufficient conductivity between the conductive layer and the current collecting layer.

Accordingly, the increase in resistance can be more sufficiently suppressed.

Hereinafter, an electric storage device of this embodiment is described with reference to the drawings by way of example in which the electric storage device is a nonaqueous electrolyte secondary battery cell.

First Embodiment

Figure 2:
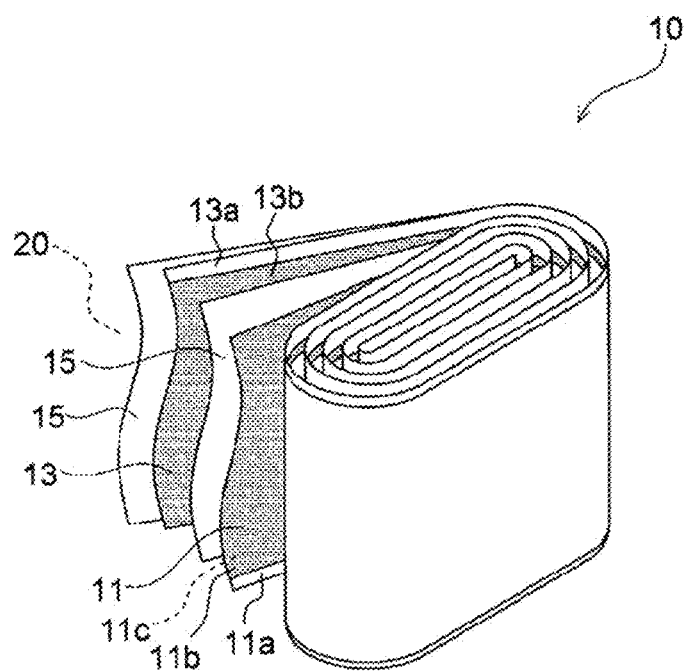
FIG. 2 is a schematic perspective view showing an electrode assembly included in the nonaqueous electrolyte secondary battery cell of this embodiment.

As shown in FIG. 1 and FIG. 2, a nonaqueous electrolyte secondary battery cell 1 as an electric storage device according to a first embodiment of the present invention includes a case 2, an electrode assembly 10 as an electrode group housed in the case 2, and an electrolyte solution 20 as an electrolyte housed in the case 2.

The electrode assembly 10 includes a positive electrode plate 11 as a first electrode plate, a negative electrode plate 13 as a second electrode plate having a polarity opposite to that of the positive electrode plate 11, and a separator 15 interposed between these electrode plates. The electrode assembly 10 is formed by stacking these components into layers.

The case 2 includes a box-shaped case body 3 housing the electrode assembly 10 and formed with an opening, and a rectangular cover 4 covering the opening of the case body 3. The case body 3 and the cover 4 are formed, for example, of stainless steel plates, and welded to each other.

Two outer gaskets 5 made of an insulating material are mounted on the outer surface of the cover 4. The cover 4 is formed with two openings. Each of the outer gaskets 5 has one opening. One of the openings of the cover 4 and the opening of one of the outer gaskets 5 are continuous to each other. Likewise, the other of the openings of the cover 4 and the opening of the other of the outer gaskets 5 are continuous to each other. The outer gaskets 5 each house an external terminal 21 thereinside.

The external terminal 21 projects inwardly of the case body 3 through the opening of the corresponding outer gasket 5 and the opening of the cover 4. The projecting portion of the external terminal 21 is connected to a current collector connected to the positive electrode plate 11 or the negative electrode plate 13 of the electrode assembly 10.

The current collector, for example, has a plate shape, which however is not particularly restrictive. The current collector is formed of the same metal material as the corresponding electrode member to be connected thereto. The external terminal 21 is formed of aluminum or aluminum alloy materials such as aluminum alloy, for example.

A set of the outer gasket 5 and the external terminal 21 is provided for each of the positive electrode and the negative electrode. The outer gasket 5 and the external terminal 21 for the positive electrode are arranged on one end side in the longitudinal direction of the cover 4. The outer gasket 5 and the external terminal 21 for the negative electrode are arranged on the other end side in the longitudinal direction of the cover 4.

The cover 4 has an inlet 6 through which the electrolyte solution 20 is injected into the case body 3. The inlet 6 is sealed after the injection of the electrolyte solution 20.

The electrode assembly 10 is housed in the case body 3. In the case body 3, one electrode assembly 10 may be housed, or a plurality of electrode assemblies 10 may be housed. In the latter case, the plurality of electrode assemblies 10 are connected electrically in parallel to one another.

The positive electrode plate 11 includes a positive electrode current collector 11a, and a positive electrode mixture layer 11b laminated onto the positive electrode current collector 11a.

The positive electrode plate 11 is described later in detail.

The negative electrode plate 13 is formed by disposing a negative electrode mixture layer 13b on a negative electrode current collector 13a such as copper foil. Specifically, the negative electrode plate 13 includes the negative electrode current collector 13a, and the negative electrode mixture layer 13b in the form of a layer containing a negative electrode active material. The negative electrode plate 13 is formed by laminating the negative electrode mixture layer 13b onto the negative electrode current collector 13a.

Examples of the negative electrode active material contained in the negative electrode mixture layer 13b include carbon materials such as amorphous carbon, non-graphitizable carbon, graphitizable carbon, and graphite.

The negative electrode mixture layer 13b contains a binder such as polyvinylidene fluoride (PVDF), and may contain a conductive additive such as acetylene black, etc., in addition to the above-mentioned negative electrode active material.

The thickness of the negative electrode mixture layer 13b is generally, though not particularly restricted to, about 20 μm to 200 μm.

The separator 15 allows the electrolyte solution 20 to permeate therethrough while blocking electrical connection between the positive electrode plate 11 and the negative electrode plate 13. Examples of the separator 15 include a porous film formed of polyolefin resins such as polyethylene. Such a porous film may contain additives such as a plasticizer, an antioxidant, and a flame retardant.

The electrolyte solution 20 is prepared by dissolving an electrolyte salt in an organic solvent.

The organic solvent used for the electrolyte solution 20 is not particularly limited. Examples thereof include ethers, ketones, lactones, nitriles, amines, amides, sulfur compounds, hydrocarbon halides, esters, carbonates, nitro compounds, phosphate ester compounds, and sulfolane hydrocarbons.

Among these, ethers, ketones, esters, lactones, hydrocarbon halides, carbonates, or sulfolane compounds are preferable.

Examples thereof include tetrahydrofuran, 2-methyltetrahydrofuran, 1,4-dioxane, anisole, monoglyme, 4-methyl-2-pentanone, ethyl acetate, methyl acetate, methyl propionate, ethyl propionate, 1,2-dichloroethane, γ-butyrolactone, dimethoxyethane, methyl formate, dimethyl carbonate, methylethyl carbonate, diethyl carbonate, propylene carbonate, ethylene carbonate, vinylene carbonate, dimethylformamide, dimethylsulfoxide, dimethylthioformamide, sulfolane, 3-methyl-sulfolane, trimethyl phosphate, and triethyl phosphate, and a mixed solvent of them.

The organic solvent is preferably cyclic carbonates or cyclic esters. The organic solvent is most preferably one or a mixture of two or more of ethylene carbonate, propylene carbonate, methylethyl carbonate, and diethyl carbonate.

Further, the electrolyte salt used for the electrolyte solution 20 is not particularly limited. However, examples thereof include $LiClO_4$, $LiBF_4$, $LiAsF_6$, $CF_3SO_3Li$, $LiPF_6$, $LiN(CF_3SO_2)_2$, $LiN(C_2F_5SO_2)_2$, $LiI$, and $LiAlCl_4$, and a mixture of them.

The electrolyte salt is preferably one or a mixture of two or more of lithium salt selected from $LiBF_4$ and $LiPF_6$.

It should be noted that the electrolyte solution 20 is not specifically limited to an electrolyte solution containing such an organic solvent and electrolyte salt as mentioned above.

Other than above, a film formed of a solid ion conducting material (solid electrolyte film) can be further used complementarily as the electrolyte. In the case of using such a film, the nonaqueous electrolyte secondary battery cell 1 can be formed of the positive electrode plate 11, the negative electrode plate 13, the separator 15 and the solid electrolyte film disposed between these electrode plates, and the electrolyte solution 20. Alternatively, the nonaqueous electrolyte secondary battery cell 1 can be formed of the positive electrode plate 11, the negative electrode plate 13, the solid electrolyte film disposed between these electrode plates, and the electrolyte solution 20.

Further, it is advantageous that the solid electrolyte film be an organic solid electrolyte formed of polyethylene oxide, polyacrylonitrile, or polyethylene glycol, or a modified product of them, when winding the solid electrolyte film, because of the lightweight and flexibility of the organic solid electrolyte. Other than above, the solid electrolyte film can be formed using an inorganic solid electrolyte, or a mixed material of an organic solid electrolyte and an inorganic solid electrolyte.

The positive electrode plate 11 of this embodiment includes the positive electrode current collector 11a, and the positive electrode mixture layer 11b laminated onto the positive electrode current collector 11a. Further, the positive electrode mixture layer 11b contains a binder 22, a conductive additive 27, primary particles 24 of an active material, and secondary particles 25 (secondary particle spheres) each having a hollow region R formed therein by aggregation of a plurality of the primary particles 24. Further, the binder 22 and the conductive additive 27 are partially distributed in the hollow region R.

As the positive electrode current collector 11a, an aluminum foil can be mentioned, for example. The thickness of the positive electrode current collector 11a is generally about 10 to 30 μm.

Figure 3:
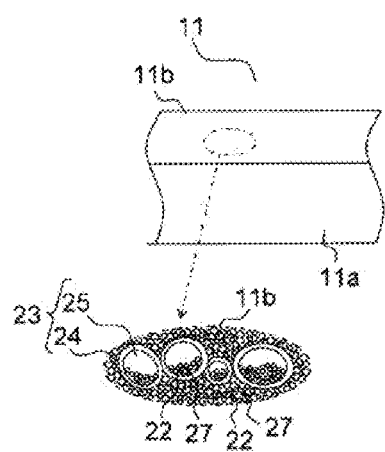
FIG. 3 is a schematic sectional view schematically showing a layer structure of a positive electrode plate of this embodiment.
Figure 4:
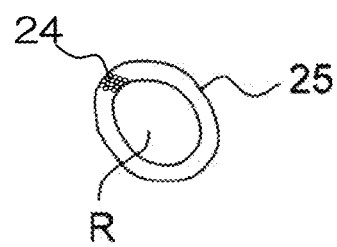
FIG. 4 is a schematic sectional view schematically showing a secondary particle of a positive electrode active material used for the positive electrode plate of this embodiment.

As shown in FIG. 3, the positive electrode mixture layer 11b contains the binder 22, the primary particles 24 of a positive electrode active material, and the secondary particles 25 (see FIG. 4) each having the hollow region R formed therein by aggregation of a plurality of the primary particles 24. In other words, the positive electrode mixture layer 11b contains the binder 22 and the primary particles 24 of the positive electrode active material. In the positive electrode mixture layer 11b, a plurality of the primary particles 24 aggregate so as to form secondary particle spheres each having the hollow region R.

Examples of the binder 22 include polyvinylidene fluoride (PVDF).

Examples of the conductive additive 27 include carbon black and acetylene black, as above.

Examples of the positive electrode active material include lithium iron phosphate represented by LiFePO$_4$, LiMnPO$_4$, and Li$_3$V$_2$(PO$_4$)$_3$.

The primary particles 24 of the positive electrode active material have an average particle size, for example, of 100 to 500 nm. The average particle size thereof can be measured by SEM observation.

Further, the secondary particles 25 each having the hollow region R formed therein by aggregation of the primary particles 24 is produced, for example, by spray drying.

Specifically, a mixed solution, for example, of lithium hydroxide monohydrate (LiOH.H$_2$O) as a lithium source, iron sulfate heptahydrate (FeSO$_4$.7H$_2$O) as an iron source, and phosphoric acid (H$_3$PO$_4$) as a phosphate source is prepared. The thus prepared mixed solution is spray-dried using a spray dryer. As a spray drying apparatus, a spray dryer (manufactured by Ohkawara Kakohki Co., Ltd.), for example, is used. In spray drying, for example, a mixture of the mixed solution and the air is sprayed into the spray dryer through a binary fluid nozzle, followed by drying, with the drying temperature at the inlet of the spray dryer set to 140° C. and the drying temperature at the outlet thereof set to 110° C., which is thereafter sintered at 700° C. for 5 hours under nitrogen airflow. This allows lithium iron phosphate to be synthesized so as to form the primary particles 24 of lithium iron phosphate, and the primary particles 24 of lithium iron phosphate aggregate, thereby producing the secondary particles 25 each having the hollow region R thereinside.

It should be noted that the shape of each secondary particle 25 is not specifically limited, as long as having the hollow region R into which the electrolyte solution 20 can penetrate. Further, the hollow region R formed inside the secondary particle 25 may be covered by aggregates of the primary particles 24, or may be partially not covered by them.

The above-mentioned secondary particles 25 (secondary particle spheres 25) have an average particle size, for example, of 5 to 20 μm. The average particle size thereof can be determined using a laser diffraction particle size distribution analyzer (manufactured by SHIMADZU CORPORATION).

It can be confirmed that at least one of the binder 22 and the conductive additive 27 is distributed in the hollow regions R, for example, by scanning secondary electron microscopy of a cross section of the active material in each electrode or electron probe microanalysis of the same cross section.

Further, how much the at least one of the binder 22 and the conductive additive 27 is distributed in the hollow regions R can be determined by electron probe microanalysis or energy-dispersive X-ray spectroscopy of the above-mentioned cross section.

The positive electrode mixture layer 11b is preferably formed by compressing, in the thickness direction, a layered stack formed by lamination of the positive electrode mixture layer 11b onto the positive electrode current collector 11a, as described later. That is, the positive electrode mixture layer 11b is preferably formed in the state where the secondary particles 25 are partially deagglomerated in the positive electrode mixture layer 11b, as shown in FIG. 3.

When the positive electrode mixture layer 11b is formed with the secondary particles 25 being partially deagglomerated in this way, positive electrode active material particles 23 are brought into closer contact with each other. Further, the positive electrode active material particles 23 obtained by the above-mentioned deagglomeration may be mediated by a conductive additive. Thus, an electrode plate in which the increase in resistance is more suppressed can be obtained.

In this way, the positive electrode mixture layer 11b is compressed while being laminated onto the positive electrode current collector 11a. This allows the positive electrode mixture layer 11b to contain the secondary particles who have partially lost their hollow regions R by the deagglomeration. The positive electrode mixture layer 11b may contain such secondary particles who have lost their hollow regions R.

Further, the positive electrode mixture layer 11b has pores. The average pore size of the pores is preferably 0.01 to 0.1 μm, more preferably 0.05 to 0.1 μm. When the average pore size of the pores is 0.01 to 0.1 μm, the secondary particles in the positive electrode mixture layer 11b are brought into closer contact with each other. Thus, the positive electrode plate 11 in which the increase in resistance is more sufficiently suppressed can be obtained.

The average pore size of the pores can be determined using an automatic porosimetry analyzer (TriStar II 3020, manufactured by SHIMADZU CORPORATION).

Further, the average pore size of the pores can be appropriately adjusted, as described later, by changing the compressive force to be applied during the compression in the thickness direction to the layered stack of the positive electrode current collector 11a and the positive electrode mixture layer 11b.

The thickness of the positive electrode mixture layer 11b is generally, though not particularly restricted to, about 20 μm to 200 μm. Further, the amount ratio of the primary particles 24 to the secondary particles 25 in the positive electrode active material particles 23 is not specifically limited, and may be appropriately set depending on the required degree of suppression of the increase in resistance.

As has been described above, the positive electrode plate 11 of this embodiment includes the positive electrode current collector 11a and the positive electrode mixture layer 11b laminated onto the positive electrode current collector 11a, and the positive electrode mixture layer 11b contains the binder 22, the conductive additive 27, the primary particles 24 of an active material, and the secondary particles 25 each having the hollow region R formed therein by aggregation of a plurality of the primary particles 24. Further, the binder 22 and the conductive additive 27 are both partially distributed in the hollow region R, for example.

According to such a configuration, the positive electrode mixture layer 11b contains the secondary particles 25 each having the hollow region R, and the binder 22 and the conductive additive 27 are both distributed in the hollow region R, thereby suppressing the increase in resistance due to the hollow region R. Accordingly, the positive electrode plate 11 in which the increase in resistance is sufficiently suppressed can be obtained.

Further, the nonaqueous electrolyte secondary battery cell 1 of this embodiment includes the above-mentioned positive electrode plate 11, the negative electrode plate 13, and the separator 15 interposed between the two electrode plates. Since such a configuration includes the above-mentioned positive electrode plate 11, the nonaqueous electrolyte secondary battery cell 1 in which the increase in resistance is sufficiently suppressed can be obtained.

Subsequently, a method for producing the nonaqueous electrolyte secondary battery cell 1 of this embodiment is described.

A production method according to this embodiment includes: an electrode plate-producing step of producing electrode plates; and a layering step of layering a first electrode plate and a second electrode plate having a polarity opposite to that of the first electrode plate via a separator, the first electrode plate and the second electrode being produced in the electrode plate-producing step, wherein the electrode plate-producing step includes: a step of preparing a mixture paste by mixing, while applying a shear force, at least one of a binder and a conductive additive, secondary particles each having a hollow region formed therein by aggregation of a plurality of primary particles of an active material, and an organic solvent, thereby allowing the organic solvent and the at least one of the binder and the conductive additive to be partially distributed in the hollow region, a step of laminating a mixture layer along the surface of the current collector by applying the mixture paste along the current collector, followed by removal of the organic solvent, and a compression step of compressing, in the thickness direction, the layered stack obtained in the step of laminating the mixture layer.

According to such a configuration, an electrode plate having a mixture layer in which at least one of the binder and the conductive additive is distributed in the hollow region is produced by forming the mixture layer by applying, to the current collector, the mixture paste in which the organic solvent and the at least one of the binder and the conductive additive each enter the hollow region, followed by removal of the organic solvent.

In this way, an electric storage device in which the increase in resistance is sufficiently suppressed, as mentioned above, can be obtained.

Further, according to another aspect of the method for producing an electric storage device of this embodiment, the electrode plate-producing step further includes a step of laminating a conductive layer onto the current collector, and a step of laminating a mixture layer onto the conductive layer is performed after the step of laminating the conductive layer.

According to the production method having such a configuration, the presence in the conductive layer of some of the primary particles as a constituent of the mixture layer allows the first electrode plate having the mixture layer and the conductive layer in comparatively close contact with each other to be produced. This suppresses the contact between the mixture layer and the conductive layer from being loosened, even when the secondary particles undergo time-dependent changes in shape or expansion and contraction due to repeated charge and discharge. Moreover, the contact between the conductive layer and the current collector provides a sufficient conductivity between the conductive layer and the current collector. Accordingly, an electric storage device in which the increase in resistance is further sufficiently suppressed can be obtained.

Here, the phrase "mixing while applying a shear force" means an operation to promote mixing of materials by applying a microscopic shear force (resistance force to deformation) to the materials during the process of mixing the materials so as to facilitate the formation of a distorted space.

This operation promotes a mixing phenomenon by applying an external force, for example, even in a disadvantageous situation in mixing at a micromolecular level in terms of the chemical potential. This operation also promotes the mixing by applying a shear force as an external force, for example, in an advantageous situation in mixing at a macroparticle level in terms of the chemical potential as in this embodiment, because an energy barrier for obtaining a desired product after the mixing is high.

A method for producing the nonaqueous electrolyte secondary battery cell 1 of this embodiment includes an electrode plate-producing step, including a positive electrode plate-producing step in which the positive electrode plate 11 is produced and a negative electrode plate-producing step in which the negative electrode plate 13 is produced; and a layering step in which the positive electrode plate 11 and the negative electrode plate 13 that are produced in the positive electrode plate-producing step are layered together via the separator 15.

First, the positive electrode plate-producing step is described.

Specifically, the positive electrode plate-producing step, for example, includes a step of preparing a positive electrode mixture paste (positive electrode mixture paste-preparing step) as a step of preparing a mixture paste.

Further, the positive electrode plate-producing step, for example, includes a step of laminating the positive electrode mixture layer 11b (positive electrode mixture layer-laminating step) as a step of laminating a mixture layer.

Further, the positive electrode plate-producing step includes a step of compressing the layered stack obtained in the positive electrode mixture layer-laminating step in the thickness direction.

In the positive electrode mixture paste-preparing step, the binder 22, the conductive additive 27, the primary particles 24 of an active material, the secondary particles 25 each having the hollow region R formed therein by aggregation of a plurality of the primary particles 24, and an organic solvent are mixed while a shear force is applied thereto. Thus, a positive electrode mixture paste in which the organic solvent and at least one of the binder and the conductive additive are partially distributed in the hollow region is prepared.

For example, in the positive electrode mixture paste-preparing step, the secondary particles 25, the binder 22, the conductive additive 27, and an organic solvent such as N-methylpyrrolidone are first mixed while a shear force is applied thereto. Next, the mixture is subjected to vacuum degassing. Thus, a positive electrode mixture paste in which the binder 22, the conductive additive 27, and the organic solvent are partially distributed in the hollow region R is prepared.

In the positive electrode mixture layer-laminating step, the positive electrode mixture layer 11b is laminated by applying the positive electrode mixture paste to the positive electrode current collector 11a and removing the organic solvent.

For example, in the positive electrode mixture layer-laminating step, the positive electrode mixture paste is applied to the positive electrode current collector 11a, and the organic solvent is removed by drying. In this way, the positive electrode mixture layer 11b is laminated onto the positive electrode current collector 11a.

In the compression step, the thus obtained layered stack is compressed by roll pressing, or the like.

Thus, the positive electrode plate 11 is produced.

The mixing apparatus used in the positive electrode mixture paste-preparing step is not specifically limited, as long as being capable of mixing the binder 22, the conductive additive 27, the secondary particles 25, and the organic solvent while applying a shear force thereby allowing the binder 22, the conductive additive 27, and the organic solvent to be partially distributed in the hollow regions R of the secondary particles 25.

Examples of such a mixing apparatus include a bead mill. The bead mill includes beads and a container capable of rotating while containing beads and materials to be mixed. The bead mill is configured so that the container rotates while containing the beads and contents, thereby mixing the contents while applying a shear force to the contents.

Further, the amount of the binder 22 or the conductive additive 27 to enter the hollow regions R is represented by the difference in density of the positive electrode mixture paste between before and after the mixing under a shear force. That is, when the density of the positive electrode mixture paste after the mixing under a shear force is higher than the density before the mixing under a shear force, the binder 22, the conductive additive 27, and the like, are considered to have entered the hollow regions R.

Further, the density after the mixing under a shear force is affected not only by the amount of the binder 22, etc., to enter the hollow regions R but also by the degree of deagglomeration of the secondary particles 25. That is, there is a tendency that, as the size of the secondary particles 25 decreases by deagglomeration, the contact of the positive electrode active material particles 23 in the positive electrode mixture layer 11b with each other and the contact of the binder 22 or the conductive additive 27 with the positive electrode active material particles are made closer, resulting in an increase in density.

On the other hand, if the density of the positive electrode mixture paste after the mixing under a shear force excessively increases, the deagglomeration of the secondary particles 25 is almost saturated, thereby coming close to density saturation.

In this way, as the density of the positive electrode mixture paste after the mixing under a shear force increases, that is, as the density difference between before the mixing under a shear force and after the mixing under a shear force increases, the above-mentioned contacts are made closer, so that the increase in resistance is more suppressed.

On the other hand, if the density difference excessively increases, the secondary particles 25 are deagglomerated too much, which results in an excessively reduced ratio of the hollow regions R in the positive electrode mixture layer 11b. This causes a reduction in function of the hollow regions R to absorb the electrolyte solution.

In consideration of these viewpoints, the density difference between before and after the mixing under a shear force, which is represented by:

[(Density after mixing)−(Density before mixing)], can be appropriately set. The density difference is preferably 0.1 to 0.3 g/cm$^3$.

Further, the density before the mixing under a shear force is preferably 1.3 to 1.4 g/cm$^3$.

On the other hand, the density after the mixing under a shear force is preferably 1.5 to 1.6 g/cm$^3$.

As mentioned above, the amount of the binder 22, the conductive additive 27, the organic solvent, etc., to enter the hollow regions R and the degree of deagglomeration of the secondary particles 25 can be adjusted by changing the conditions in the mixing apparatus for the mixing under a shear force.

Specifically, the higher the shear and mixing degree in the mixing apparatus, the more the amount of the conductive additive 27, etc., to enter the hollow regions R increases. However, if the shear and mixing degree is excessively high, the secondary particles 25 are excessively deagglomerated, which may possibly result in an excessively reduced ratio of the hollow regions R in the positive electrode mixture layer 11b.

For example, in the case where the mixing apparatus is a bead mill, the larger the quantity of beads in the container, the more the amount of the conductive additive 27, etc., to enter the hollow regions R increases. However, if the quantity of beads is excessively large, the secondary particles 25 are excessively deagglomerated, which may possibly result in an excessively reduced ratio of the hollow regions R in the positive electrode mixture layer 11b.

Further, the higher the rotational speed of the container, the more the amount of the conductive additive 27, etc., to enter the hollow regions R increases. However, if the rotational speed of the container is excessively high, the secondary particles 25 are excessively deagglomerated, which may possibly result in an excessively reduced ratio of the hollow regions R in the positive electrode mixture layer 11b.

For example, in consideration of the above-mentioned viewpoints, mixing conditions of the bead mill can be appropriately set.

Vacuum degassing in the step of preparing a mixture paste is carried out by a conventionally known vacuum degassing apparatus.

In the positive electrode mixture layer-laminating step, a conventionally known coating apparatus is used for applying the positive electrode mixture paste onto the positive electrode current collector 11a, and a conventionally known drying apparatus is used for drying the thus applied positive electrode mixture paste.

In the compression step, a conventionally known compression apparatus is used for compressing the layered stack.

Examples of the compression apparatus include a roller pressing apparatus.

The compressive force in the compression step is not specifically limited as long as the compressive force allows the hollow regions R of the secondary particles 25 to remain present even after the compression, and is appropriately set.

In the compression step, for example, the larger the compressive force, the more the secondary particles 25 are deagglomerated, thereby allowing closer contact of the positive electrode active material particles 23 in the positive electrode mixture layer 11b with each other. However, if the compressive force is excessively large, the secondary particles 25 are excessively deagglomerated, which may possibly result in an excessively reduced ratio of the hollow regions R in the positive electrode mixture layer 11b.

For example, in consideration of the above-mentioned viewpoints, the compressive force can be appropriately set. For example, the compressive force is preferably set to 50 to 500 kgf/cm.

In the above-mentioned positive electrode plate-producing step, the positive electrode mixture paste in which the binder 22, the conductive additive 27, and the organic solvent are partially distributed in the hollow region R is applied onto the positive electrode current collector 11a. Then, the organic solvent is removed therefrom. Thus, the positive electrode mixture layer 11b is laminated onto the positive electrode current collector 11a. Thereby, the positive electrode plate 11 is produced, where the binder 22 and the conductive additive 27 are partially distributed in the hollow regions R within the positive electrode mixture layer 11b. By producing the positive electrode plate 11 in such a manner, the positive electrode plate 11 in which the increase in resistance is sufficiently suppressed can be obtained, as mentioned above.

Meanwhile, in the negative electrode plate-producing step, a negative electrode 13 is produced.

For example, in the negative electrode plate-producing step, a negative electrode active material, a binder, a conductive additive, or the like, and an organic solvent are mixed to obtain a mixture in paste form (negative electrode mixture paste). This mixture is applied to the negative electrode current collector 13a, followed by drying. Thereafter, the resultant layered stack is compressed by roll pressing, or the like, so that the negative electrode plate 13 is produced.

Next, a step of layering the positive electrode plate 11 and the negative electrode plate 13 via the separator 15 is described.

Specifically, the positive electrode plate 11 and the negative electrode plate 13 produced as above are first prepared.

Next, the positive electrode plate 11, the separator 15, the negative electrode plate 13, and the separator 15 are layered together in this order, which is thereafter wound up. Thus, the electrode assembly 10 is formed. Subsequently, the electrode assembly 10 is inserted into the case body 3. Thereafter, current collectors are connected respectively to the positive electrode plate 11 and the negative electrode plate 13. Further, the case body 3 is covered by the cover 4 on which the outer gaskets 5 and the external terminals 21 are mounted, and the external terminals 21 are connected respectively to the current collectors. In this state, the case body 3 and the cover 4 are welded to each other. The electrolyte solution 20 is injected through the inlet 6. Finally, the inlet 6 is closed. Thus, a nonaqueous electrolyte secondary battery cell is produced.

According to the above-mentioned method for producing the nonaqueous electrolyte secondary battery cell 1, the nonaqueous electrolyte secondary battery cell 1 including the positive electrode plate 11 produced by the positive electrode plate-producing step is produced. Therefore, the nonaqueous electrolyte secondary battery cell 1 in which the resistance is sufficiently suppressed can be obtained.

Second Embodiment

The nonaqueous electrolyte secondary battery cell 1 as an electric storage device according to a second embodiment of the present invention is described.

Figure 5:
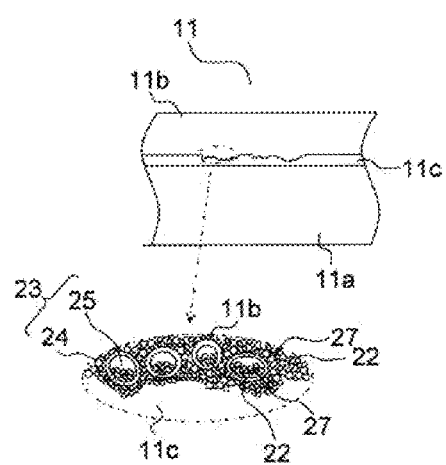
FIG. 5 is a schematic sectional view schematically showing a layer structure of a positive electrode plate according to a second embodiment of the present invention.

The nonaqueous electrolyte secondary battery cell 1 of the second embodiment further includes a conductive layer 11c between the positive electrode current collector 11a and the positive electrode mixture layer 11b, as shown in FIG. 5. Other than above, it has the same configuration as the configuration of the above-mentioned first embodiment, and therefore the description thereof is not repeated.

The conductive layer 11c is softer than the positive electrode current collector 11a.

It is confirmed that the conductive layer 11c is softer than the positive electrode current collector 11a by comparison of Vickers hardness between the conductive layer 11c and the positive electrode current collector 11a.

Vickers hardness (Hv) is a value obtained by dividing the load when a pyramidal recess is formed on a surface of a specimen using a diamond indenter in the form of a square pyramid with an angle of 136° between opposite faces by the diagonal length of the recess (as measured by a method in accordance with JIS Z2244).

When the conductive layer 11c has a Vickers hardness lower than that of the positive electrode current collector 11a, it is confirmed that the conductive layer 11c is softer than the positive electrode current collector 11a.

Vickers hardness of the conductive layer 11c is not specifically limited, and can be appropriately set so as to be lower than that of the positive electrode current collector 11a.

For example, as the difference in Vickers hardness between the conductive layer 11c and the positive electrode current collector 11a, expressed as [(Vickers hardness of the positive electrode current collector 11a)−(Vickers hardness of the conductive layer 11c)], increases, it is easier for the secondary particles 25 in the positive electrode mixture layer 11b to indent (dig) the conductive layer 11c. This brings the conductive layer 11c and the positive electrode mixture layer 11b into closer contact with each other.

However, if the above-mentioned difference in Vickers hardness is excessively high, Vickers hardness of the conductive layer 11c is excessively low, which may result in the conductive layer 11c with poor strength. Further, if Vickers hardness of the positive electrode current collector 11a is excessively high, the positive electrode current collector 11a may possibly be difficult to wind up.

In consideration of the above-mentioned viewpoints, the difference in Vickers hardness can be appropriately set. The difference in Vickers hardness is preferably at least 5 but not more than 35.

Further, Vickers hardness of the conductive layer 11c is preferably at least 5 but not more than 15.

Further, Vickers hardness of the positive electrode current collector 11a is preferably at least 20 but not more than 40.

The thickness of the conductive layer 11c is preferably 0.1 to 3.0 μm, more preferably 0.1 to 1.0 μm.

The conductive layer 11c, for example, contains a conductive agent and a binder.

The conductive agent is not specifically limited as long as being an electrically conductive material such that the conductive layer 11c formed using the conductive agent is allowed to be softer than the positive electrode current collector 11a. Examples of the conductive agent include carbon black and acetylene black.

The binder is not specifically limited as long as being a material that is capable of binding the conductive agent to itself, binding the conductive agent to the positive electrode current collector 11a, and binding the conductive agent to the positive electrode mixture layer 11b, and is softer than the positive electrode current collector 11a. Examples of the binder include polyvinylidene fluoride as mentioned above.

As has been mentioned above, the positive electrode plate 11 according to the second embodiment further includes the conductive layer 11c between the positive electrode current collector 11a and the positive electrode mixture layer 11b. In the positive electrode plate 11, the primary particles 24 as a constituent of the positive electrode mixture layer 11b partially indent the conductive layer 11c. The primary particles 24 indenting the conductive layer 11c function as an anchor.

When the primary particles 24 contained in the positive electrode mixture layer 11b are partially retained in the conductive layer 11c, as mentioned above, the positive electrode mixture layer 11b and the conductive layer 11c are brought into comparatively close contact with each other. Further, even if the secondary particles 25 undergo time-dependent changes or expansion and contraction due to repeated charge and discharge, the contact between the positive electrode mixture layer 11b and the conductive layer 11c is suppressed from being made loose. Moreover, the aforementioned anchor function allows a sufficient conductivity to be maintained between the positive electrode mixture layer 11b and the conductive layer 11c. Meanwhile, the conductivity between the conductive layer 11c and the positive electrode current collector 11a is also maintained sufficient.

Accordingly, the positive electrode plate 11 in which the increase in resistance is more sufficiently suppressed can be obtained.

Further, in the positive electrode plate 11 according to the second embodiment, the conductive layer 11c is softer than the positive electrode current collector 11a.

This facilitates indentation of the primary particles 24 contained in the positive electrode mixture layer 11b into the conductive layer 11c when the positive electrode plate 11 is formed by compressing a layered stack of the positive electrode current collector 11a, the conductive layer 11c, and the positive electrode mixture layer 11b in the thickness direction. Accordingly, the contact between the positive electrode mixture layer 11b and the conductive layer 11c is made closer than the contact between the conductive layer 11c and the positive electrode current collector 11a. This allows the positive electrode plate 11 in which the increase in resistance is more sufficiently suppressed to be obtained.

Further, the positive electrode plate 11 according to the second embodiment is formed so that a layered stack of the positive electrode current collector 11a, the conductive layer 11c, and the positive electrode mixture layer 11b is compressed in the thickness direction, thereby allowing part of the secondary particles 25 in the positive electrode mixture layer 11b to be deagglomerated, while allowing other part of the secondary particles 25 to indent the conductive layer 11c, as mentioned above. Such indentation of the positive electrode mixture layer 11b into the conductive layer 11c brings the positive electrode mixture layer 11b and the conductive layer 11c into closer contact with each other. Accordingly, the positive electrode plate 11 in which the increase in resistance is further sufficiently suppressed can be obtained.

Further, the nonaqueous electrolyte secondary battery cell 1 according to the second embodiment includes the positive electrode plate 11 produced as mentioned above, and therefore the increase in resistance is further sufficiently suppressed.

Subsequently, a method for producing the nonaqueous electrolyte secondary battery cell 1 according to the second embodiment is described.

It should be noted that, the method for producing the nonaqueous electrolyte secondary battery cell 1 according to the second embodiment is the same as the method for producing the nonaqueous electrolyte secondary battery cell 1 according to the first embodiment except for further including a conductive layer-laminating step of laminating the conductive layer 11c that is softer than the positive electrode current collector 11a onto the positive electrode current collector 11a.

In the method for producing the nonaqueous electrolyte secondary battery cell 1 according to the second embodiment, the positive electrode mixture layer-laminating step is performed after the conductive layer-laminating step, so that the positive electrode mixture layer 11b is laminated onto the conductive layer 11c. That is, the method for producing the nonaqueous electrolyte secondary battery cell 1 according to the second embodiment is the same as the method for producing the nonaqueous electrolyte secondary battery cell 1 according to the first embodiment except that the positive electrode plate 11 having the above-mentioned conductive layer 11c is used. Accordingly, the same description as in the production method of the first embodiment is not repeated.

In the method for producing the nonaqueous electrolyte secondary battery cell 1 according to the second embodiment, the positive electrode plate-producing step is performed, for example, as follows.

Specifically, in the positive electrode plate-producing step, a conductive agent, a binder, and an organic solvent such as N-methylpyrrolidone are first mixed, so that a mixture in paste form (conductive layer mixture paste) is prepared (conductive layer mixture paste-preparing step).

This mixture is applied onto the positive electrode current collector 11a, followed by drying. Thus, the conductive layer 11c is laminated onto the positive electrode current collector 11a (conductive layer-laminating step).

Next, the positive electrode mixture paste prepared in the above-mentioned positive electrode mixture paste-preparing step is applied to the conductive layer 11c, followed by drying. Thus, the positive electrode mixture layer 11b is laminated onto the conductive layer 11c (positive electrode mixture layer-laminating step).

Then, the thus obtained layered stack is compressed by roll pressing, or the like (compression step).

In this way, the positive electrode plate 11 is produced.

In the conductive layer-laminating step, a conventionally known coating apparatus is used for applying the conductive layer mixture paste onto the positive electrode current collector 11a, and a conventionally known drying apparatus is used for drying the thus applied conductive layer mixture paste.

In the compression step, the same compression apparatus as in the above-mentioned first embodiment is used. In the compression step, the larger the compressive force to compress the layered stack, the closer the positive electrode active material particles 23 are brought into contact with each other, as mentioned in the first embodiment. Further, the primary particles 24 indent the conductive layer 11c more sufficiently. However, if the compressive force to compress the layered stack is excessively large, the secondary particles 25 may possibly be excessively deagglomerated, as mentioned in the first embodiment.

In consideration of the above-mentioned viewpoints, the compressive force is appropriately set. The compressive force, for example, is preferably set to 50 to 500 kgf/cm.

Next, the thus produced positive electrode plate 11 and the negative electrode plate 13 are layered together via the separator 15. Then, the nonaqueous electrolyte secondary battery cell 1 is produced by performing the same steps as in above.

According to such a method for producing the nonaqueous electrolyte secondary battery cell 1, the nonaqueous electrolyte secondary battery cell 1 including the positive electrode plate 11 that has the conductive layer 11c is produced, and therefore the nonaqueous electrolyte secondary battery cell 1 in which the increase in resistance is more sufficiently suppressed can be obtained.

It should be noted that the method for producing the nonaqueous electrolyte secondary battery cell 1 is not specifically limited to the above-mentioned production method. The positive electrode plate-producing step also is not specifically limited to the above-mentioned step.

As has been described above, the electric storage device and the method for producing the electric storage device according to this embodiment provide an electric storage device in which the increase in resistance is sufficiently suppressed and a method for producing such an electric storage device.

Although the electric storage device and the method for producing the electric storage device according to the present invention are as mentioned above, the present invention is not limited to the above-exemplified embodiments. The design can be appropriately modified within the scope intended by the present invention.

For example, the negative electrode mixture layer 13b of the negative electrode plate 13 may be configured so as to have a binder, a conductive additive, and secondary particles each having a hollow region formed therein by aggregation of a plurality of primary particles of a negative electrode active material, so that the binder and the conductive additive are partially distributed in the hollow region.

Further, the negative electrode plate 13 may be configured so as to include a conductive layer between the negative electrode current collector 13a and the negative electrode mixture layer 13b.

Further, the battery cell of the present invention is suitable as a nonaqueous electrolyte secondary battery cell, particularly, a lithium ion secondary battery cell, and is further suitable as a large battery cell. However, the battery cell of the present invention is not specifically limited to these. Further, the present invention is not limited also to those having the actions and effects of the above-mentioned embodiments.

Although the electric storage device and the method for producing the electric storage device according to the aforementioned embodiments are as mentioned above, the present invention is not limited to the embodiments mentioned above as an example. The design can be appropriately modified within the scope intended by the present invention. The operational advantage of the present invention is also not limited to the foregoing embodiments.

The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

EXAMPLES

Next, the present invention is described further in detail by way of examples. However, the present invention is not limited to these examples.

<Production of Lithium Iron Phosphate (LiFePO$_4$) Secondary Particles Each Having a Hollow Region>

A mixed solution of lithium hydroxide monohydrate (LiOH.H$_2$O) as a lithium source, iron sulfate heptahydrate (FeSO$_4$.7H$_2$O) as an iron source, phosphoric acid (H$_3$PO$_4$) as a phosphate source at a molar ratio of 1:1:1 was prepared.

The mixed solution prepared above was spray-dried using a spray dryer (manufactured by Ohkawara Kakohki Co., Ltd.). In spray drying, a mixture of the mixed solution and the air was sprayed into the spray dryer through a binary fluid nozzle so as to be dried at a drying temperature at the inlet of 140° C. and a drying temperature at the outlet of 110° C. After the drying, the dried product was sintered at 700° C. for 5 hours under nitrogen airflow. In this way, lithium iron phosphate as a positive electrode active material was synthesized, and primary particles of lithium iron phosphate aggregated, thereby producing secondary particles each having a hollow region thereinside. The average particle size of the thus produced secondary particles was measured using a laser diffraction particle size distribution analyzer (manufactured by SHIMADZU CORPORATION). As a result, their average particle size was 10 μm (in all the following experiments, the same method was employed for measuring average particle sizes).

<Production of a Positive Electrode Plate Having a Conductive Layer>

First, 50 mass % of carbon black as a conductive agent and 50 mass % of PVDF were mixed. To this mixture was added N-methylpyrrolidone as a solvent. Thus, a conductive agent mixture paste was prepared. The conductive layer mixture paste was applied to each of both sides of an aluminum foil with a thickness of 20 μm as a positive electrode current collector so as to form a conductive layer of 1.4 g/m$^2$. It was further dried, and thus a conductive layer was formed.

Next, 80 mass % of positive electrode active material particles including the above produced secondary particles of the positive electrode active material each having a hollow region, 10 mass % of acetylene black as a conductive additive, and 10 mass % of PVDF were mixed. To this mixture was added N-methylpyrrolidone as a solvent. Thus, a positive electrode mixture paste was prepared. The positive electrode mixture paste was applied to each of both sides of an aluminum foil with a thickness of 10 μm as a positive electrode current collector so as to form a positive electrode mixture layer of 1.5 g/100 cm$^2$. It was further dried. Then, the thus obtained positive electrode mixture layer was stacked on the above produced conductive layer.

Thereafter, the above produced layered stack was subjected to compression molding with a load of 100 kgf/cm using a roll press. Thus, a strip-shaped positive electrode plate was produced. The positive electrode member had a length of 500 cm, a width of 10 cm, and a thickness of 180 μm in total of the positive electrode current collectors, respectively with the conductive layers and the positive electrode mixture layers on their both sides.

Vickers hardness of a positive electrode current collector and a conductive layer in the positive electrode plate 11 was measured, using a dynamic ultra micro hardness tester (DUH-211S, manufactured by SHIMADZU CORPORATION) which functions as a Vickers hardness meter, under specific conditions according to JIS Z2244. The positive electrode current collector and the conductive layer respectively had a hardness of 30 and 10.

<Production of a Negative Electrode Plate>

90 mass % of a negative electrode active material, 2 mass % of acetylene black as a conductive additive, and 8 mass % of PVDF were mixed. To this mixture was added N-methylpyrrolidone as a solvent. Thus, a negative electrode mixture paste was prepared. The negative electrode mixture paste was applied to each of both sides of a copper foil as a negative electrode current collector having a thickness of 10 μm so as to form a negative electrode mixture layer of 0.8 g/100 cm$^2$. It was further dried, and thus the negative electrode mixture layer was formed. Thereafter, the above produced layered stack was subjected to compression molding with a load of 100 kgf/cm using a roll press. Thus, a strip-shaped negative electrode plate was produced. The negative electrode member had a length of 500 cm, a width of 10 cm, and a thickness of 120 μm in total of the negative electrode current collector, and the negative electrode mixture layers on both sides of the negative electrode current collector.

<Production of Test Battery Cells>

A positive electrode tab and a negative electrode tab were attached respectively to the positive electrode plate and the negative electrode plate produced as above.

Further, a microporous polyolefin film having a width of 12 cm and a thickness of 25 μm was prepared as a separator.

Next, the positive electrode plate, a separator, the negative electrode plate, and a separator were disposed in layers in this order, which were further wound into an elongated cylindrical shape. Thus, an electrode assembly was produced. The electrode assembly was housed in a case body, and a cover was mounted on the case. Furthermore, an electrolyte solution was injected into the case. Thus, test battery cells were each produced.

Figure 6:
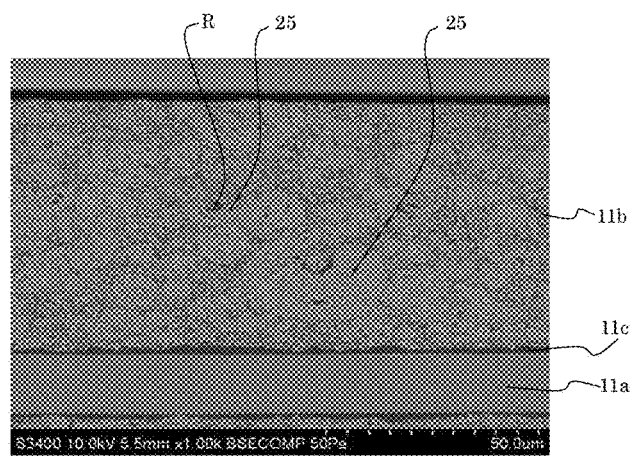
FIG. 6 is a picture of a cross section in the thickness direction of a positive electrode plate observed by SEM.
Figure 7:
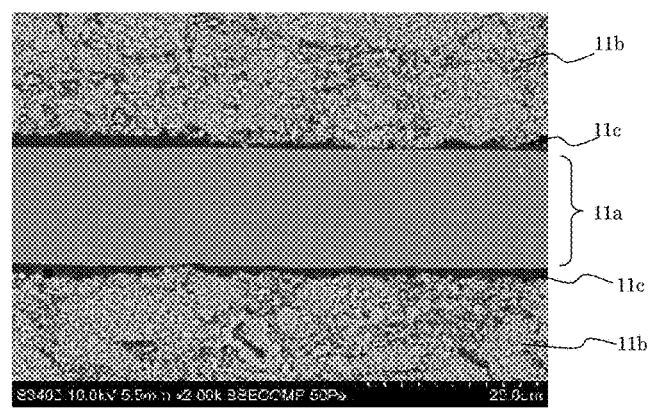
FIG. 7 is a picture of the cross section in the thickness direction of the positive electrode plate observed by SEM.
Figure 8:
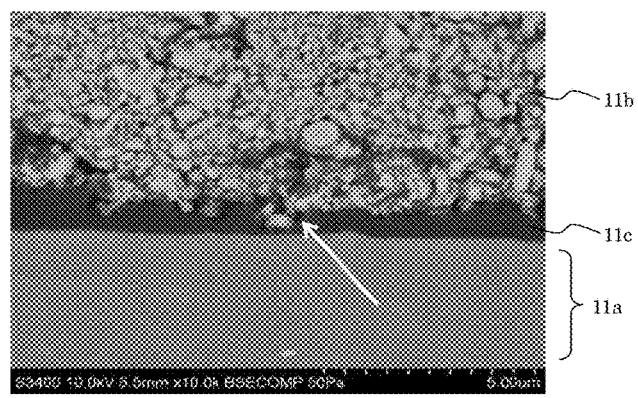
FIG. 8 is a picture of the cross section in the thickness direction of the positive electrode plate observed by SEM.

FIG. 6 to FIG. 8 each show a picture of a cross section of the positive electrode plate observed by SEM. The magnification was 1,000 times in FIG. 6, 2,000 times in FIG. 7, and 10,000 times in FIG. 8.

As seen from FIG. 8 (indicated by the arrow), the primary particles as a constituent of the mixture layer were partially retained in the conductive layer. That is, the primary particles contained in the positive electrode mixture layer partially indent the conductive layer.

Further, the positive electrode plate was subjected to elemental analysis using an FE-EPMA (field emission electron probe microanalyzer), "JXA-8500F", manufactured by JEOL Ltd. FIG. 9 to FIG. 14 show the results.

Figure 9:
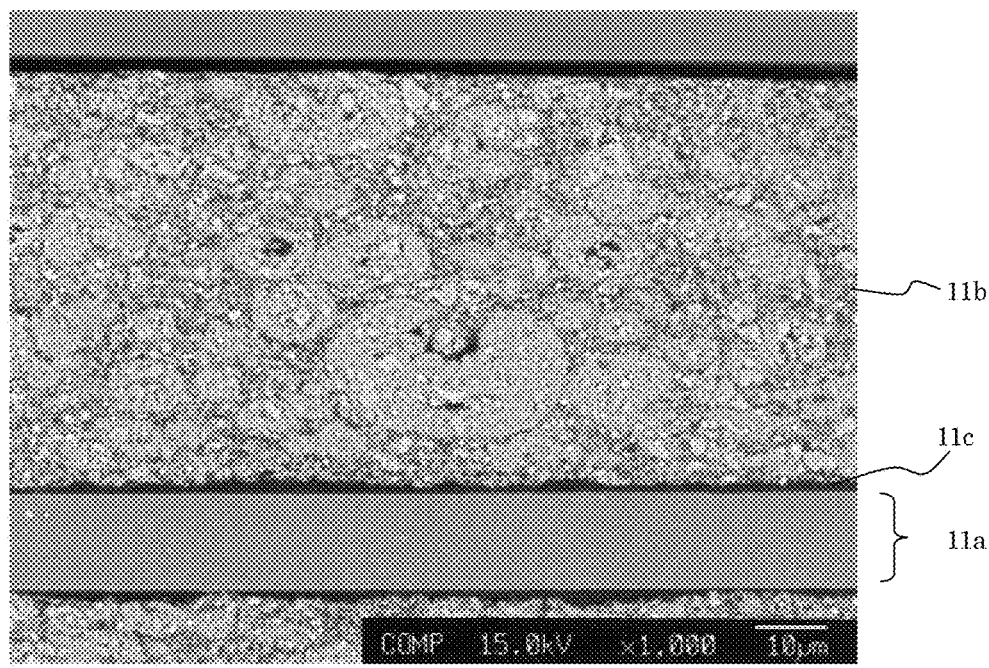
FIG. 9 is a picture of a cross section in the thickness direction of the positive electrode plate observed by SEM.
Figure 10:
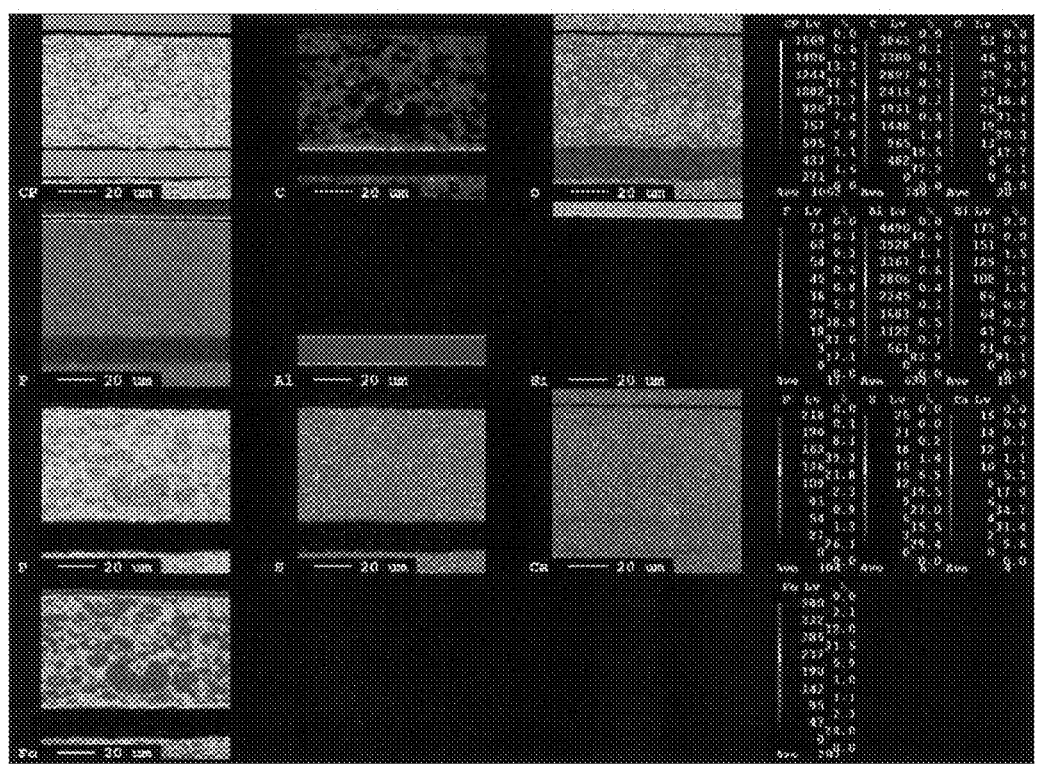
FIG. 10 is a picture showing the results of elemental analysis.

FIG. 9 is a picture, observed by SEM, showing a portion subjected to elemental analysis. FIG. 10 shows the results of the elemental analysis of the portion shown in FIG. 9. The upper left picture in FIG. 10 is an image observed by SEM.

As seen particularly from the analysis results for F (second picture from the top on the left side) and C (center picture on the upper side) shown in FIG. 10, a substance containing the element F or C enters the hollow region of each of the secondary particles. That is, polyvinylidene fluoride or acetylene black enters the hollow region of the secondary particles.

Figure 11:
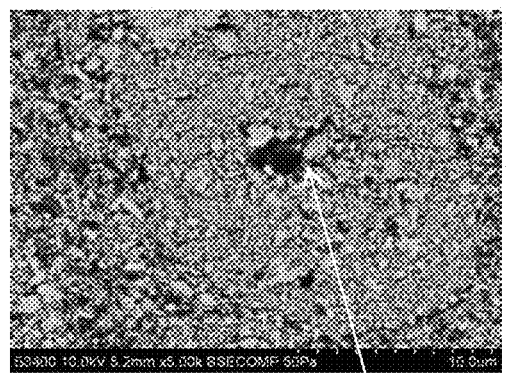
FIG. 11 is a picture showing an image observed by SEM in a portion subjected to elemental analysis.
Figure 12:
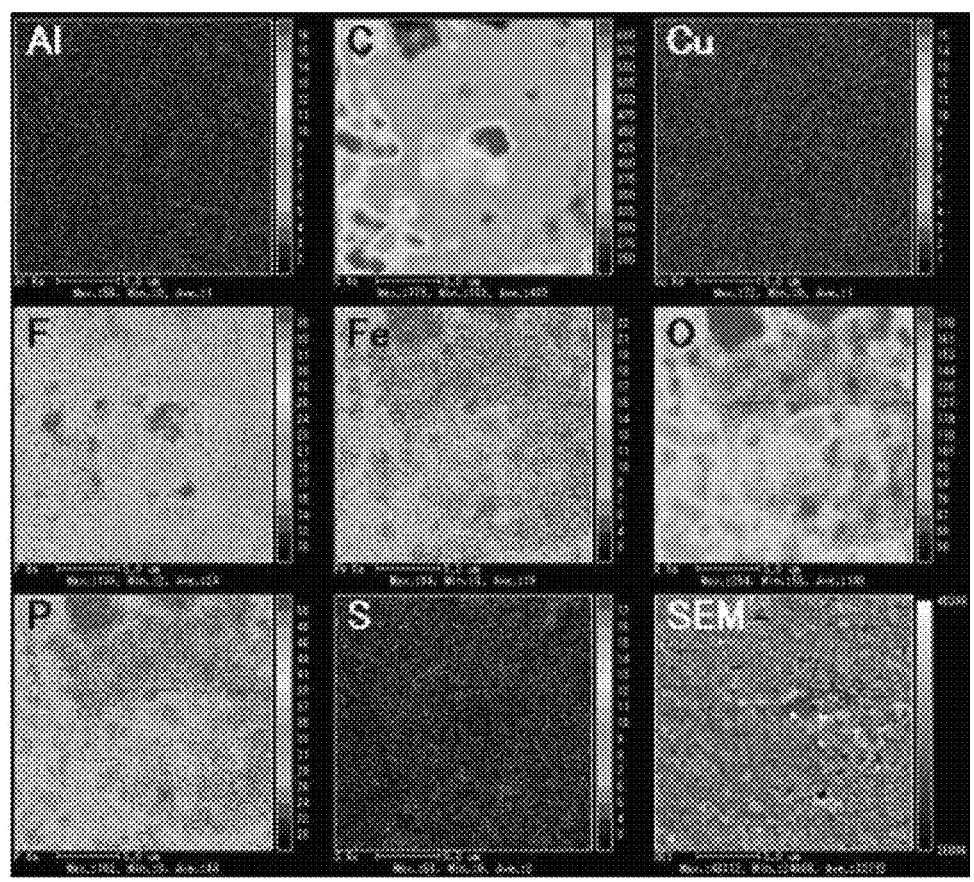
FIG. 12 is a picture showing the results of elemental analysis.

Likewise, FIG. 11 is a picture, observed by SEM, of a portion subjected to elemental analysis. FIG. 12 shows the results of the elemental analysis of the portion shown in FIG. 11. The lower right picture in FIG. 12 is an image observed by SEM.

As shown by the arrow of FIG. 11, polyvinylidene fluoride or acetylene black enters the hollow region.

Figure 13:
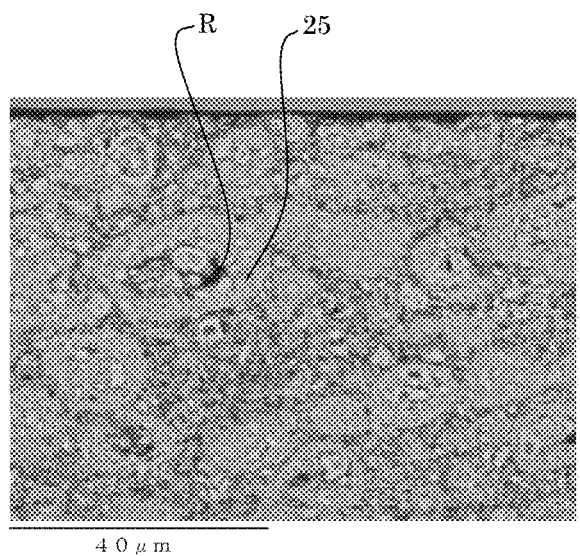
FIG. 13 is a picture showing an image observed by SEM in a portion subjected to elemental analysis.
Figure 14:
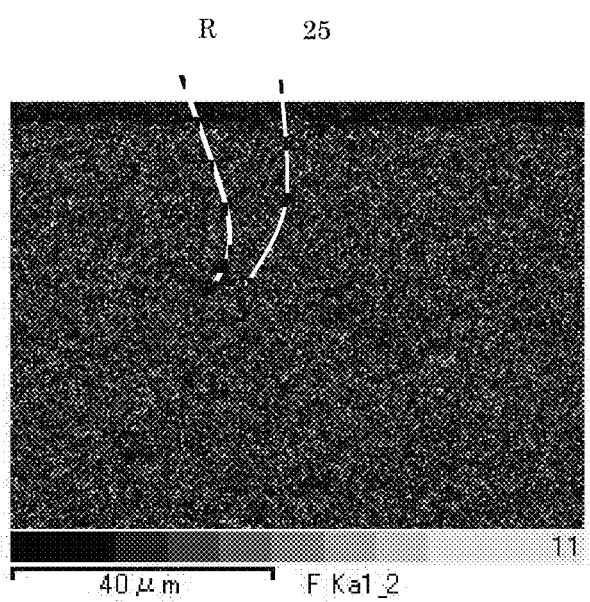
FIG. 14 is a picture showing the results of analysis for element F.

Likewise, FIG. 13 is a picture, observed by SEM, of a portion subjected to elemental analysis. FIG. 14 shows the results of the elemental analysis for F in the portion shown in FIG. 13.

What is claimed is:

1. An electric storage device, comprising:
   a first electrode plate;
   a second electrode plate having a polarity opposite to that of the first electrode plate; and
   a separator interposed between the first electrode plate and the second electrode plate,
   wherein the first electrode plate includes a current collector and a mixture layer laminated onto the current collector,
   wherein the mixture layer contains at least one of a binder and a conductive additive, and further contains a combination of primary particles of an active material and secondary particles formed by aggregated primary particles of the active material,
   wherein the primary particles not aggregated to form the secondary particles are disposed between the secondary particles and exist independently of the secondary particles,
   wherein each of the secondary particles includes a hollow region, and
   wherein the at least one of the binder and the conductive additive is partially distributed in the hollow region.

2. The electric storage device according to claim 1, wherein the mixture layer includes pores, and the pores have an average pore size of 0.01 μm to 0.1 μm.

3. The electric storage device according to claim 1, wherein the first electrode plate further includes a conductive layer between the current collector and the mixture layer, and
   wherein the aggregated primary particles and the primary particles not aggregated as a constituent of the mixture layer are partially retained in the conductive layer.

4. The electric storage device according to claim 1, wherein the active material contained in the mixture layer comprises lithium iron phosphate.

5. The electric storage device according to claim 1, wherein the primary particles including the aggregated primary particles and the primary particles not aggregated have an average particle size of 100 nm to 500 nm.

6. The electric storage device according to claim 1, wherein a layered stack of the current collector and the mixture layer is compressed in a thickness direction by a compressive force of 50 kgf/cm to 500 kgf/cm.

7. The electric storage device according to claim 1, wherein the binder comprises polyvinylidene fluoride.

8. The electric storage device according to claim 1, wherein the conductive additive is comprises acetylene black.

9. The electric storage device according to claim 1, wherein the mixture layer comprises the binder and the conductive additive.

10. The electric storage device according to claim 1, wherein the first electrode plate further includes a conductive layer disposed between the current collector and the mixture layer, and
    wherein the conductive layer has a lower Vickers hardness than the current collector.

11. The electric storage device according to claim 10, wherein, in the first electrode plate, the aggregated primary particles and the primary particles not aggregated partially indent the conductive layer.

12. An electrode plate of an electric storage device, the electrode plate comprising:
    a current collector; and
    a mixture layer laminated onto the current collector,
    wherein the mixture layer comprises at least one of a binder and a conductive additive, and further comprises a combination of primary particles of an active material and secondary particles formed by aggregated primary particles of the active material,
    wherein the primary particles not aggregated to form the secondary particles are disposed between the secondary particles and exist independently of the secondary particles,
    wherein each of the secondary particles includes a hollow region, and
    wherein the at least one of the binder and the conductive additive is partially distributed in the hollow region.

13. The electrode plate of the electric storage device according to claim 12, wherein the mixture layer comprises the binder and the conductive additive.

14. The electrode plate of the electric storage device according to claim 12, wherein the electrode plate further comprises a conductive layer disposed between the current collector and the mixture layer, and
    wherein the conductive layer has a lower Vickers hardness than the current collector.

15. The electrode plate of the electric storage device according to claim 14, wherein, in the electrode plate, the aggregated primary particles and the primary particles not aggregated partially indent the conductive layer.

16. The electrode plate of the electric storage device according to claim 12, wherein the active material contained in the mixture layer comprises lithium iron phosphate.

* * * * *